United States Patent [19]

Criscenzo et al.

[11] Patent Number: 5,168,518
[45] Date of Patent: Dec. 1, 1992

[54] COIN TONE VALIDATOR FOR TELEPHONE PAYSTATIONS

[75] Inventors: Guy Criscenzo, Waltham; Minh Hoang, Acton, both of Mass.

[73] Assignee: Boston Technology, Inc., Wakefield, Mass.

[21] Appl. No.: 774,335

[22] Filed: Oct. 10, 1991

[51] Int. Cl.5 .......................................... A04M 17/02
[52] U.S. Cl. ................................... 379/145; 379/146; 379/154
[58] Field of Search .................. 379/145, 146, 154; 194/202

[56] References Cited

U.S. PATENT DOCUMENTS

| | | |
|---|---|---|
| 3,863,036 | 1/1975 | McCrudden . |
| 3,933,232 | 1/1976 | Searle et al. ............... 194/100 R |
| 4,031,325 | 6/1977 | Dudonis et al. . |
| 4,046,962 | 9/1977 | Rogers . |
| 4,074,079 | 2/1978 | Pnell et al. ............... 379/145 |
| 4,076,962 | 2/1978 | Streisand . |
| 4,079,208 | 3/1978 | Rogers et al. . |
| 4,124,774 | 11/1978 | Zarouni ............... 379/146 |
| 4,326,103 | 4/1982 | Oehrig . |
| 4,924,497 | 5/1990 | Smith et al. ............... 379/150 |

Primary Examiner—Stafford D. Schreyer
Attorney, Agent, or Firm—Staas & Halsey

[57] ABSTRACT

A coin tone validator (CTV) is located in a local central office and is connected between a pay telephone and a switching system. The CTV monitors DC loop current changes using opto-couplers inserted into a local loop in addition to measuring standard 1700 Hz and 2200 Hz tone frequencies generated when a coin is inserted into the paystation. A comparison of the two components, the current changes and the frequencies, is performed to determine a timing and magnitude relationship. If the frequency component is misaligned within a specified time frame or the magnitude is not sufficient, then the tones received or the current change sensed are dismissed as interference. The CTV prevents users of pay telephones from fraudulently generating coin tones that are acoustically coupled into the handset of a paystation from a calling station at any time during a call.

12 Claims, 6 Drawing Sheets

COIN TONE BURSTS
FROM PAYPHONE 20
1 QUARTER 20-100MS

FIG. 3A

OUTPUT FROM OPTO-
COUPLER 60
(D-TYPE PAYPHONE)

FIG. 3B

OUTPUT FROM OPTO-
COUPLER 60
(C-TYPE PAYPHONE)

FIG. 3C

OUTPUT FROM 1700HZ (i) +5V / 0V
FREQ. DETECTOR 40

OUTPUT FROM 2200HZ (ii) +5V / 0V
FREQ. DETECTOR 38

FIG. 3H  OUTPUT FROM "OR" GATE 84

FIG. 3I  OUTPUT FROM D-FLIP-FLOP 82

FIG. 3J  OUTPUT FROM MULTIVIBRATOR 86

FIG. 3K  OUTPUT OF "OR" GATE 90

FIG. 3L  OUTPUTS OF DE-GLITCHES 54 (i) (ii)

FIG. 4A ENVELOPE DATA 49 OUTPUT 
— COMPARATOR 72 TRIGGERS
— COMPARATOR 70 TRIGGERS

FIG. 4B COMPARATOR 70 OUTPUT

FIG. 4C COMPARATOR 72 OUTPUT 
— RISE TIME TOO SLOW
a

FIG. 4D MULTIVIBRATOR 80 OUTPUT 
|650μs|

FIG. 4E OR GATE 84 OUTPUT 
— DOES NOT CHANGE STATE IF RISE TIME IS TOO SLOW

FIG. 4F MULTIVIBRATOR 86 OUTPUT 
NO VALIDATION IS EVER GENERATED IF "OR" GATE 84 DOES NOT CHANGE STATE

COIN TONE VALIDATOR FOR TELEPHONE PAYSTATIONS

BACKGROUND OF THE INVENTION

1. Field of the Invention

The present invention is directed to a coin tone validator (CTV) for verifying coin drops occurring in a telephone paystation and, more particularly, to a CTV located in a local central office and connected between a pay telephone and a switching system and/or voice message storage system. The CTV monitors DC loop current changes in addition to measuring standard 1700 Hz and 2200 Hz coin tone frequencies generated when a coin is dropped.

2. Description of the Related Art

When a caller places a call, a coin is dropped into a pay telephone. The coin must be physically validated before the coin amount is determined. If the coin is determined to be counterfeit, it is returned to the caller by way of a coin return slot. If the coin is determined to be real, the coin is inserted into a coin signalling unit. Upon receipt of the coin, the conventional coin signalling unit switches off the mouthpiece of the handset so that noise contamination is eliminated. A coin tone oscillator is then placed on the line and sends appropriate coin tone signal bursts down a loop to a local central office. After the coin tones have been sent, the mouthpiece of the handset turns on and the coin is directed into a coin relay hopper. At this time, an electrical connection is made, via a coin relay, from a TIP side of the loop to EARTH to provide a signal to satisfy a coin presence test to be performed by the local central office. (The TIP side being a physical tip of a cord board connector; a RING being a slip ring around the cord board connector, and a sleeve being EARTH). A coin call cannot be completed without this connection being established. Coins in the coin relay hopper remain there until the call is terminated by the caller hanging up. At that time, the coins are released into either a coin collection box or a return slot if the call was not completed. The TIP to EARTH connection is removed at this time.

In pay telephone systems, when the handset of the telephone is first lifted from the cradle causing an "off-hook" state and initiating a dial tone, coin tones are not generated from the coin signalling unit until enough coins are inserted into the pay telephone to meet a base rate. The base rate is the minimum amount of coinage needed to initiate a coin call. The base rate is set internally in the pay telephone. For example, if the base rate of the pay telephone is set to twenty cents, the coin signalling unit will not generate any coin tones for five, ten or fifteen cents dropped into the pay telephone. When, however, twenty cents or more has been inserted into the pay telephone, the total amount inserted is sent in bursts by the coin tone oscillator to the local central office. Each burst represents five cents.

The majority of pay telephone sets in use are C-type sets and D-type sets; the D-type set being a newer version of the C-type set. In C-type sets when a coin is dropped, a coin tone signal burst is output from a coin tone generator for every five cents a caller inserts (a quarter consists of 5 consecutive tone bursts). The coin tone generator continuously generates coin tone bursts which have an immediate loop current drop at the beginning of the coin tone signal burst string and then a loop current surge upon completion. Tones appear during the loop current drop. These coin tone signal bursts must conform to the "tone-on", "tone-off" times specified by Bell Communication Research (Bellcore) or will not be accepted by the central office tone detection equipment as valid tones. In a D-type telephone set, a separate loop current pulse is present for each coin tone burst caused by a coin being dropped into the pay telephone. Each of the loop current pulses exhibits a fast rise time but slow decay time.

There is a problem, however, in that pay telephone users can fraudulently generate coin tones from the calling station. External devices can be used to inject the proper coin tone frequencies through the mouthpiece of the handset once one real coin has been inserted into the pay telephone to establish the TIP to EARTH connection. Prior art detection systems determine only whether the frequencies generated by the coin tone generator conform to Bellcore specifications, before performing a coin presence test at the end of a digit string. As a result, the central office equipment cannot distinguish between real coin tone energy generated by the coin tone generator and injected signals of the same frequencies. Therefore, an accurate validation of the correct amount of coins deposited is not possible with the prior art detectors.

SUMMARY OF THE INVENTION

It is an object of the present invention to provide a coin tone validator which accurately detects the existence of coins dropped into pay telephones for making a telephone call.

It is another object of the present invention to provide a coin-tone validator which differentiates between real coin tone energy and other noise.

It is a further object of the present invention to provide a coin tone validator which prevents pay telephone users from fraudulently generating coin tones in a pay telephone in which the hand set is acoustically coupled to a central office at any time during a call.

It is also an object of the present invention to provide a coin tone validator which employs time validation and magnitude validation of the coin tone energy to ensure that a real coin has been dropped into the pay telephone.

The above-mentioned objects of the present invention are obtained by providing a coin tone validator (CTV) including tone detection means, validation means, and time and alignment comparing means. The tone detection means includes filtering means and frequency detector means. The tone detection means detects the presence of frequencies generated when coins are inserted into the pay telephone. The validation means includes current surge sensor means, rise time and amplitude comparator means, reset pulse generator means and pulse generator means. The current surge sensor means comprises opto-couplers connected in series with the loop for detecting a coin tone direct current (DC) signature. The rise time and amplitude comparator means includes comparators for receiving a signal from the current surge sensor means and comparing the signal with predetermined values to qualify the rise time of the signal. The reset pulse generator means includes a comparator and limits the pulse window for the signal from the tone detection means. The pulse window generator means includes a flip-flop, a logic gate and multivibrators. The pulse window generator means is a coin validation signal generator which generates a qualifying pulse window having a duration greater than an expected duration generated by the pay telephone. The time and alignment comparing means compares the pulse window with a pulse train generated from the tone detection means. A set of pulses is then output to a microprocessor which qualifies the pulse train generated by tone detection means and acknowledges that the coin is an actual coin and what denomination was deposited.

These objects, together with other objects and advantages which will be subsequently apparent, reside in the details of construction and operation as more fully described and claimed hereinafter, reference being had to the accompanying drawings forming a part hereof, wherein like reference numerals refer to like parts throughout.

DESCRIPTION OF THE PREFERRED EMBODIMENTS

Figure 1:
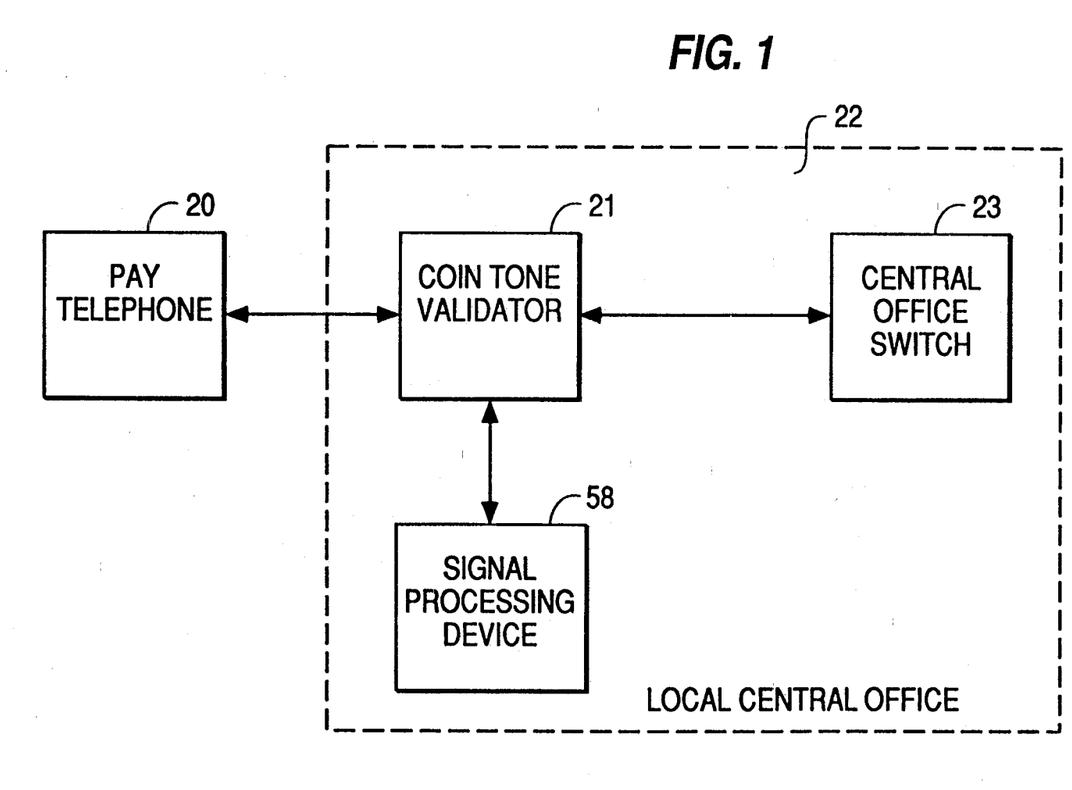
FIG. 1 is a block diagram of a telephone system employing a coin tone validator system of the present invention.

FIG. 1 is a block diagram of a telephone system employing the present invention. A pay telephone 20 is connected to a coin tone validator (CTV) 21 located within the local central office 22. A local central office switch 23 is connected to the CTV 21. A signal processing device 58 is also connected to the CTV 21. The signal processing device 58 interprets and compiles data from the CTV 21 and can be used to gather statistics, perform coin accounting and/or connect the caller to speech circuits for playing a prompt.

Figure 2:
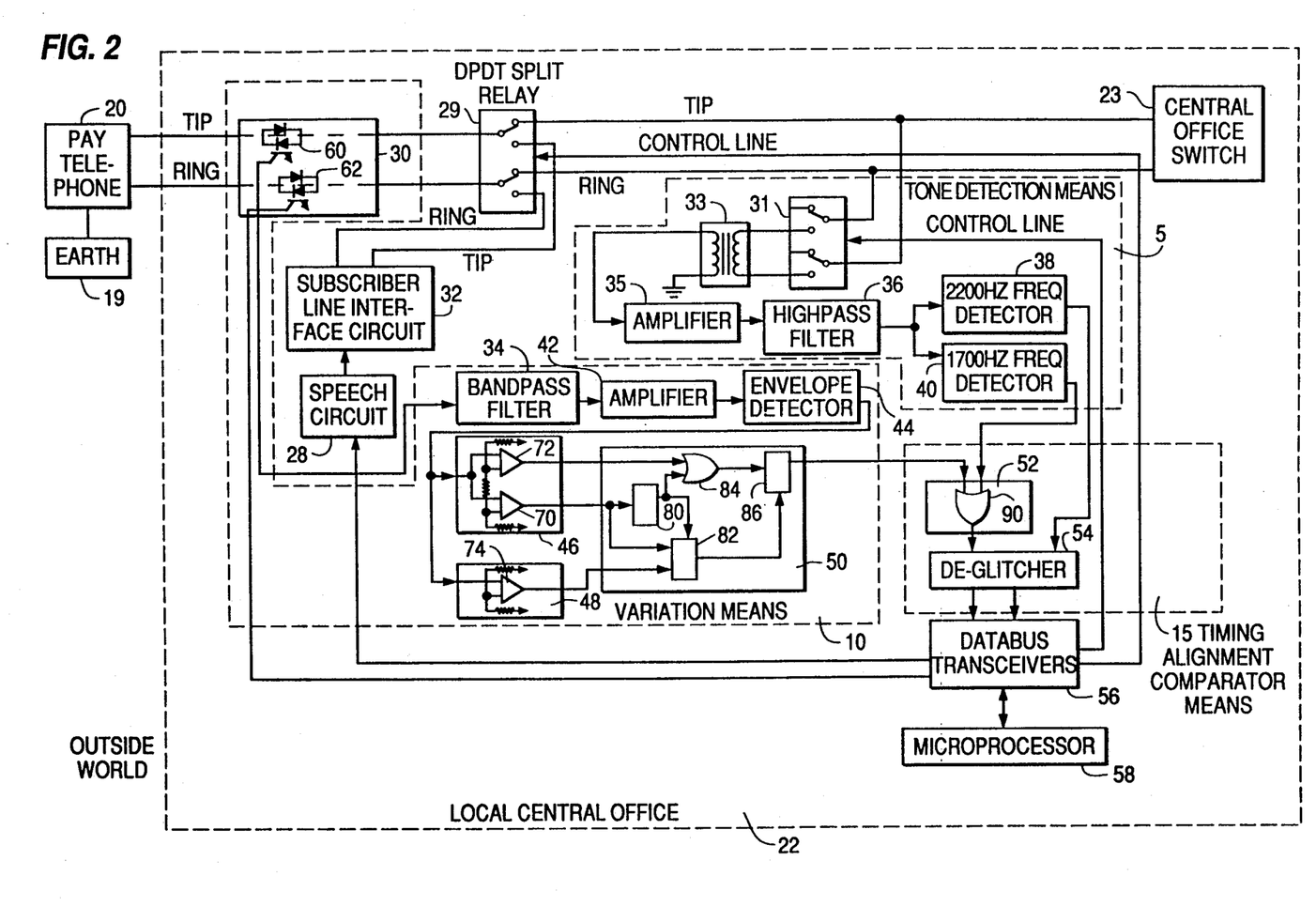
FIG. 2 is a partial circuit diagram of the coin tone validator system according to the present invention.

FIG. 2 is a partial circuit diagram of the CTV system according to the present invention. As mentioned above, the CTV 21 is connected between the pay telephone 20 and the central office switch 23 and resides in the local central office 22. The CTV 21 includes three major sections: tone detection means 5, validation means 10 and timing alignment comparator means 15.

The tone detection means 5 includes a double pole, double throw (DPDT) relay 31 that bridges a conventional 600 ohm audio transformer 33 onto the TIP and RING leads of the pay telephone loop. The audio transformer 33 couples the signals from the TIP and RING leads of the loop to a conventional amplifier 35 which provides an output to a conventional high pass filter 36 which is designed to have a corner frequency of 1.28 KHz. The output of the high pass filter 36 is connected to the inputs of a 2200 Hz frequency detector 38 and a 1700 Hz frequency detector 40. The frequency detectors 38 and 40 are phased locked loops that are known and used in the art.

The validation means 10 includes a conventional current surge sensor/line isolator 30 connected in series with the pay telephone loop. The current surge sensor 30 provides an isolated output to a conventional bandpass filter 34 designed to pass frequencies, for example, between 2.5 Hz and 185 Hz. The output of bandpass filter 34 is connected to the input of a conventional amplifier 42 to provide a sufficient signal amplitude for a conventional envelope detector 44, rise time and amplitude comparator 46 and reset pulse generator 48.

As noted above, the validation means 10 includes a band pass filter 34 in addition to a conventional amplifier 42, a conventional envelope detector 44, a rise time and amplitude comparator 46, a reset pulse generator 48 and a coin validation signal generator 50. The rise time and amplitude comparator 46, reset pulse generator 48 and coin validation signal generator 50 are described in more detail below.

The output from the band pass filter 34 is input to the amplifier 42 which amplifies the filtered signal. The envelope detector 44 eliminates noise from the filtered signal. The output signal from the envelope detector 44 is input to the rise time and amplitude comparator 46 and also to the reset pulse generator 48. The outputs from these two circuits are both input to the coin validation signal generator 50. The coin validation signal from the coin validation signal generator 50 is then input to the timing alignment comparator means 15, which includes a coin present signal generator 52 and a conventional signal de-glitcher 54, along with one of the outputs from one of the two frequency detectors 38 and 40.

The input to the coin present signal generator 52 is shown in FIG. 2 as being output from the 1700 Hz frequency detector 40. The output from the coin present signal generator 52 is then input along with the output from the 2200 Hz frequency detector 38 into a conventional de-glitcher 54 which removes extraneous noise from the signal and then inputs a signal to data bus transceivers 56. The signal is then sent to a microprocessor 58 which verifies that a valid coin has been inserted. The de-glitcher 54, data bus transceivers 56 and microprocessor 58 are all standard circuits known and used in the art.

The present invention monitors DC loop current changes and standard 1700 Hz and 2200 Hz coin tone frequencies generated when a coin is inserted. That is, the present invention employs frequency detection and current signature detection to determine whether a real coin has been inserted into a pay telephone. Frequency detection is performed using phase locked loops for frequency detectors 38 and 40 which detect the presence of 1700 Hz and 2200 Hz coin tone frequencies. Current signature detection is performed using optocoupler 6 in the current surge sensor 30 to determine whether a real coin has been inserted into the pay telephone.

A comparison of the two components of the signal generated by the inserted coin, the current and frequency, is then checked for correct timing and magnitude. If one component is misaligned and does not fall within a specified time frame or if the magnitude is insufficient, the tones received or the sensed current change are dismissed as being interference. Thus, the present invention uses a varying load current characteristic of a coin tone generator mechanism which occurs while generating tone bursts to validate a coin. The operation of the device will now be discussed.

In the CTV 21, three modes of operation are possible: an "idle" mode, a "monitor" mode, and a "split" mode. During the "idle" mode, the pay telephone is in an "on-hook" condition and the CTV tone detection means 5 is disconnected from the loop by the DPDT relay 31 in FIG. 2 so as not to interfere with the loop testing equipment. An "on-hook" condition is detected by the absence of loop current using the opto-coupler 62 in the current surge sensor 30. The current surge sensor 30 includes a minimum of two opto-couplers 60 and 62 connected in series with each side of the pay telephone loop to maintain balance. The opto-coupler 60 is used for detecting a current surge and the opto-coupler 62 is used for detecting whether loop current is present.

During the "monitor" mode, the pay telephone is in an "off-hook" condition. The CTV will sense an "off-hook" condition using opto-coupler 62. When the CTV senses that the pay telephone has gone "off-hook", indicated by a signal on the data bus transceiver 56, the microprocessor 58 through the data bus transceiver 56 will activate DPDT relay 31, bridging the tone detection means 5 onto the loop and begin monitoring for coin tones and a digit string.

The "split" mode is entered only when the CTV has determined that the coin tones it has received are false, when an insufficient amount of coins are dropped, or when no coin tones have been detected once a digit string being dialed has been completed. A dual tone, multifrequency (DTMF) receiver (generally located between the amplifier 35 and the data bus transceiver 56) detects the digit string (not shown.)

During the "split" mode, the pay telephone is disconnected from the central office switch 23 using DPDT relay 29 and is connected to a subscriber line interface circuit 32. The microprocessor 58 activates the DPDT relay 29 through the data bus transceiver 56. The subscriber line interface circuit 32 is then connected to a speech generator circuit 28 to inform the caller that an insufficient amount of coins was received or to try again. Not shown are the loop holding circuits needed to maintain loop current so that coin return voltages may still be applied once a caller has gone "on-hook." The subscriber interface circuit 32, speech generator circuit 28, DTMF receiver and loop holding circuits are all known and used in the art.

The opto-coupler 62 has a transistor which operates in the saturation mode. This provides a two state output used to inform the microprocessor 58 whether a loop current is present. The opto-coupler 60 has a linear type transistor which provides a representation of the changing current waveform to be used by the validation means 10.

The output from the opto-coupler 60 is input to the band pass filter 34 which is a standard passive adjustable band pass filter. The pass band of band pass filter 34 is adjustable so that it can be easily calibrated to compensate for different line noise conditions. The signal output from band pass filter 34 is then input to the amplifier 42. The amplified signal is then input to the envelope detector 44 which removes any unwanted negative going signals that may be present due to signal noise.

The output from the envelope detector 44 is input to the rise time and amplitude comparator 46 and a reset pulse generator 48. The rise time and amplitude comparator 46 includes, as shown in FIG. 2, first and second comparators 70 and 72 connected together and set so that comparator 72 has a greater threshold level than that of comparator 70. The reset pulse generator 48 includes a third comparator 74. The conventional comparators 70, 72 and 74 determine if the received signal meets predetermined characteristics. That is, the first and second comparators 70 and 72 qualify the rise time and amplitude of the signal from the envelope detector 44. The third comparator 74 of the reset pulse generator 48 is used to detect the presence of a glitch (a portion of the waveform which becomes more negative during a short period of time) that follows the end of every coin tone generation cycle (see, for example, "g" in FIGS. 3(B), 3(C) and 3(E)). This glitch is a result of the disconnecting of the coin tone generator in the pay telephone.

The outputs from the rise time and amplitude comparator 46 and the reset pulse generator 48 are input to the coin validation signal generator 50. When a signal from the envelope detector 44 triggers the first comparator 70 in the rise time and amplitude comparator 46, an output is sent to trigger a conventional monostable multivibrator 80 (pulse generator) and to a conventional D-type flip-flop 82 in the coin validation signal generator 50. The monostable multivibrator 80 generates a pulse having a fixed duration "T" (in microseconds $\mu s$). The pulse is input to one input of a conventional two-input OR gate 84 and the output from the second comparator 72 is input to the other input of the OR gate 84. The second comparator 72 is set to a predetermined threshold "M" (in millivolts mV) that is more positive than that of the first comparator 70. The output from the OR gate 84 is connected to the trigger input of a conventional monostable multivibrator 86. The monostable multivibrator 86 provides the coin validation window in which the coin tones must appear in order to be validated.

The output from the monostable multivibrator 80 is used to provide a time window. The output from the second comparator 72 must change state within this time window in order to provide a trigger pulse on the output of the OR gate 84. If the output of the second comparator 72 changes state within the time window provided by the monostable multivibrator 80, then the signal received from the envelope detector 44 has a sufficient amplitude and rise time to qualify as a possible coin tone current signature. If the output of the second comparator 72 does not change state within the time window provided by the monostable multivibrator 80, then the output of the OR gate 84 does not change state and does not provide a trigger pulse to the monostable multivibrator 86.

The third comparator 74 of the reset pulse generator 48 is set to have a threshold more negative than that of the threshold of the first comparator 70 to detect the terminating glitch mentioned previously. Upon receiving the terminating glitch, the third comparator 74 provides a clock signal to the D-type flip-flop 82. The output of the flip-flop 82 is connected to a "clear" input of the monostable multivibrator 86. Upon receipt of a clock signal, the flip-flop 82 will terminate the coin tone validation window generated by the monostable multivibrator 86.

When the coin tone validation window is generated, it is compared, in the coin present signal generator 52 with one of the outputs from frequency detectors 38 and 40 (in this embodiment, the 1700 Hz frequency detector 40 is used) to generate a pulse, corresponding to each five cents dropped into the pay telephone.

The coin present signal generator 52 is a two input OR gate 90. When the coin tone validation window is present on one input, the output of the OR gate 90 of the coin present signal generator 52 will mimic the output of the 1700 Hz frequency detector 40 connected to the other OR gate input.

If the coin tone validation window is not present or has too short a duration, the output of the OR gate 90 will not mimic the output of the 1700 Hz frequency detector 40. If the 1700 Hz frequency detector 40 does not generate a pulse while the coin tone pulse window is being generated, the OR gate 90 will not mimic the outut of the 1700 Hz frequency detector 40.

The output of the coin present signal generator 52 is then sent through a de-glitcher circuit 54 along with the output from the 2200 Hz frequency detector 38 to remove any extraneous noise. The outputs from the de-glitcher 54 are then input to data bus transceivers 56 to be read by the microprocessor 58. The microprocessor 58 performs a final validation of the 1700 Hz and 2200 Hz tones for timing alignment and duration.

FIGS. 3(A)-3(L) are timing diagrams of the waveforms that trigger a coin validation signal in accordance with the embodiment described above.

Figure 3A:
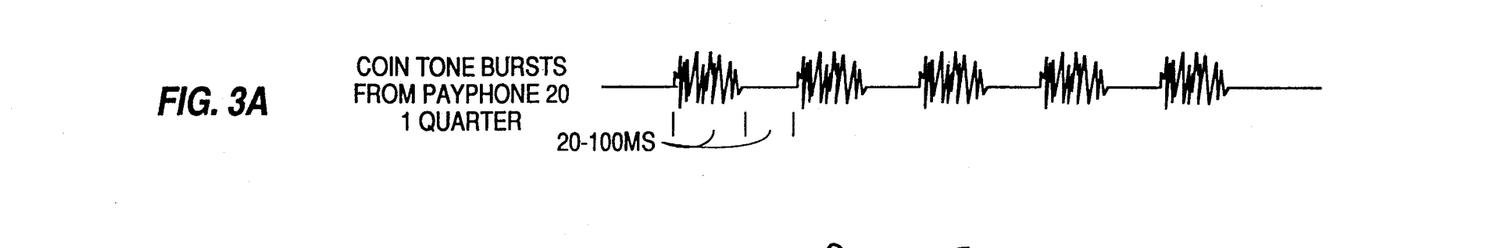
FIGS. 3(A)-3(L) are timing diagrams of the waveforms that trigger a coin validation signal.
Figures 3B, 3C, 3D:
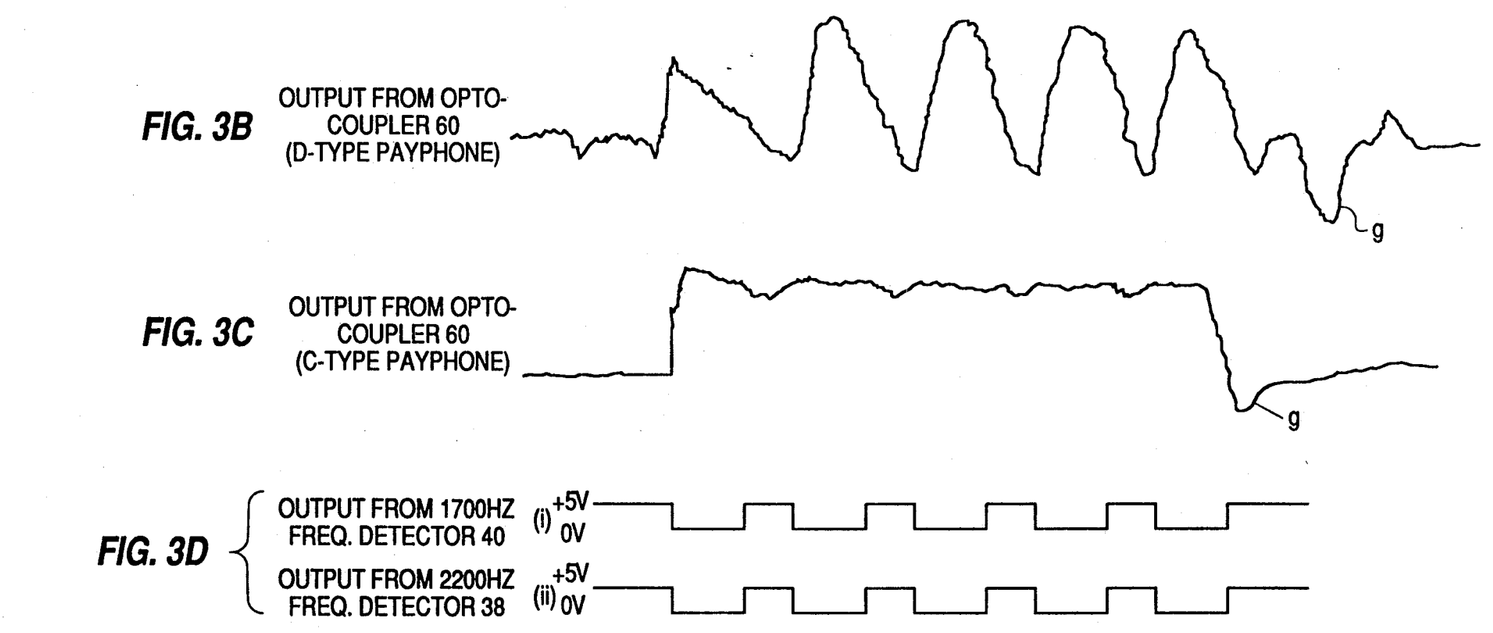

The waveform in FIG. 3(A) shows coin tone bursts from a pay telephone 20 when, for example, a quarter is inserted. The waveform in FIG. 3(B) is the output from the optocoupler 60 connected to a D-type pay phone after the pay phone receives the quarter. There is one current shift for each 5 cents inserted in the D-type system. The waveform in FIG. 3(C) shows the output from the optocoupler 60 connected to a C-type pay phone in which current shift is continuous for the duration of the tone burst.

Figure 3E:
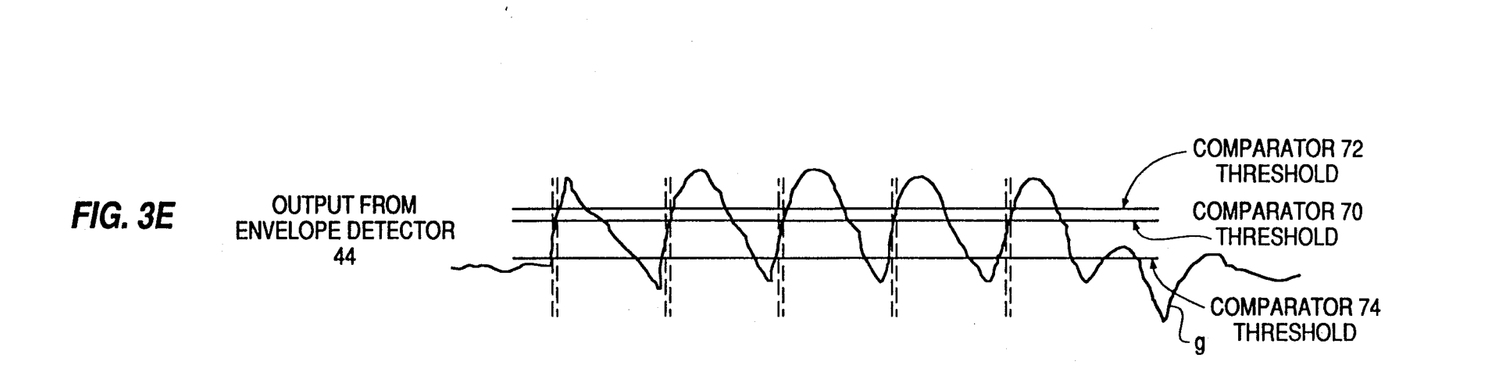
Figure 3F:
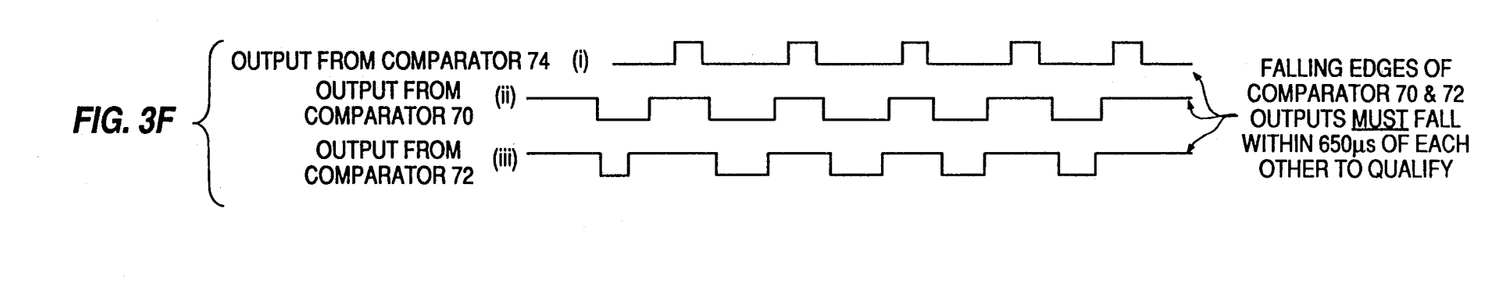
Figure 3G:
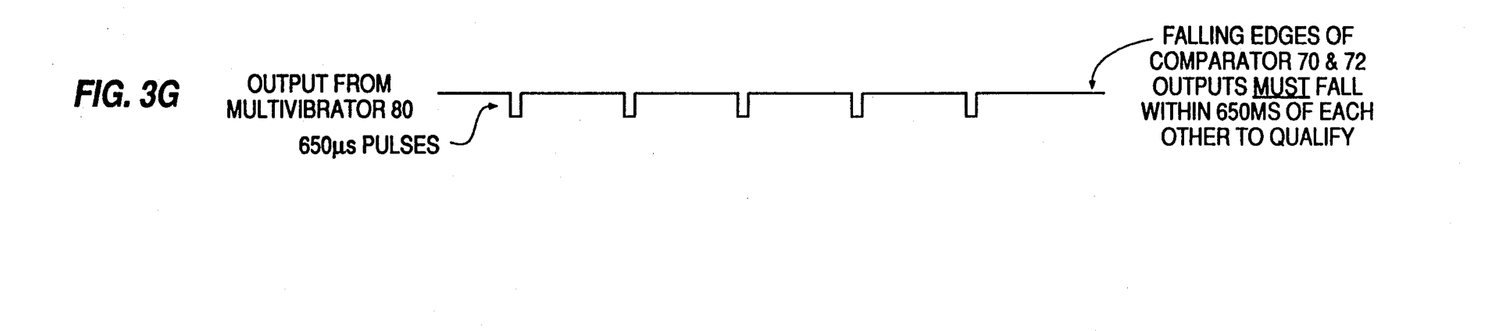
Figure 3H:
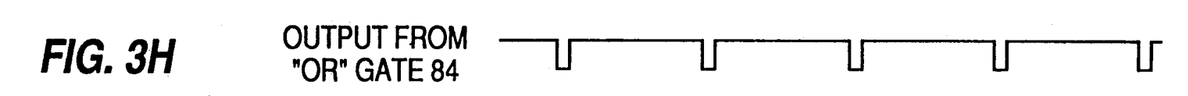
Figure 3I:
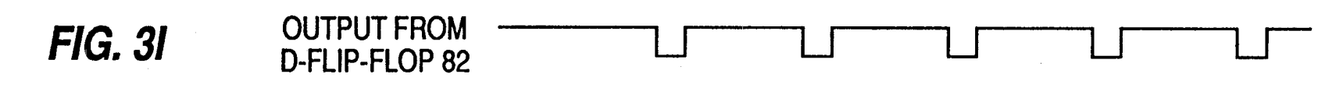
Figure 3J:
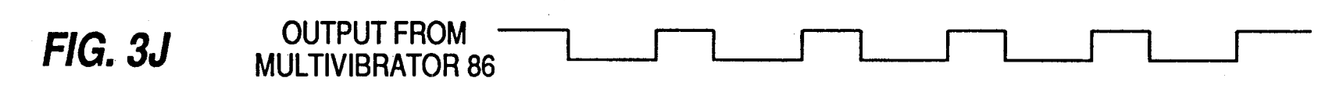
Figure 3K:
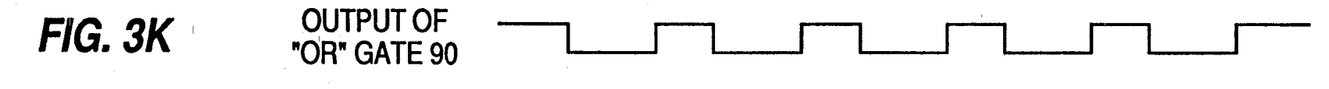
Figure 3L:
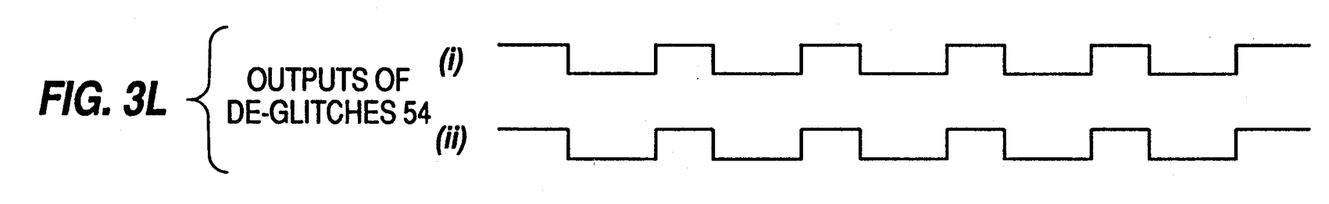

The waveforms in FIG. 3(D) (i)-(ii) show the outputs from the 1700 Hz frequency detector 40 and the 2200 Hz frequency detector 38 upon receipt of a quarter in both the C-type and D-type pay telephones. The waveform in FIG. 3(E) shows the output from the envelope detector 44 for the D-type pay telephone. The envelope detector waveform is used to trigger the comparators 70, 72 and 74 and attains an amplitude greater than the thresholds of comparators 70, 72 and 74 when a quarter is inserted The waveforms in FIG. 3(F) (i)-(iii) show the output of the comparators 70, 72 and 74. The falling edge of the outputs of the comparators 70 and 72 must fall within, in this example, a 650 $\mu$s pulse output from the multivibrator 80 in order to qualify the coin drop as shown by the waveform in FIG. 3(G). The waveforms in FIGS. 3(H)-3(L) show the outputs from the flip-flop 82, OR gate 84, multivibrator 86, OR gate 90 and de-glitcher 54 when a valid coin is inserted into the system. A validation signal is output from the multivibrator 86. The coin tone bursts must fall within the output pulses generated by the multivibrator 86 in order to be qualified.

FIGS. 4(A)-4(F) depict timing diagrams that show both valid and invalid conditions. The dotted lines depict when an invalid coin or a false tone is output from the envelope detector 44.

Figure 4A:
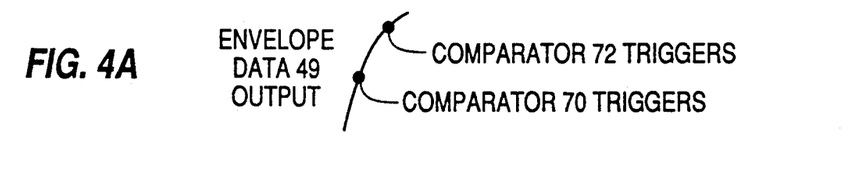
FIGS. 4(A)-4(F) are timing diagrams of the waveforms when an invalid coin is inserted into a telephone system employing the coin tone validator system of the present invention.

FIG. 4(A) shows the output from the envelope detector 44 with the comparator thresholds for comparators 70 and 72.

Figure 4B:
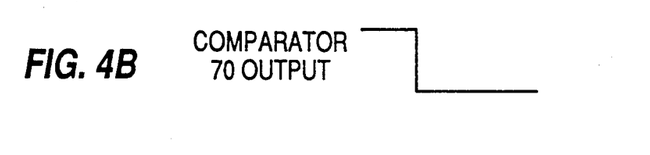
Figure 4C:
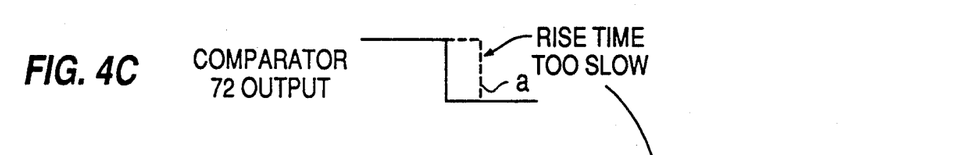
Figure 4D:
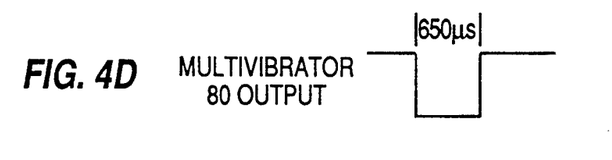
Figure 4E:
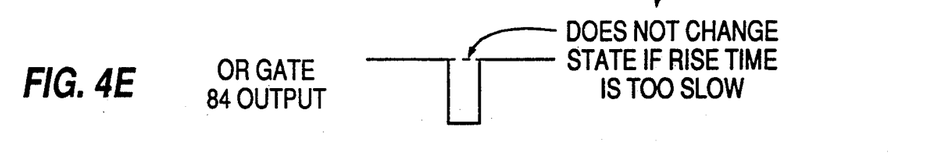
Figure 4F:
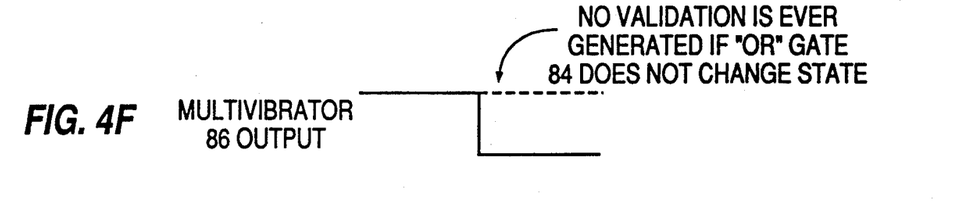

FIG. 4(B) shows the output from the comparator 70. FIG. 4(C) shows the output from the comparator 72 when the rise time of output from the envelope detector 44 is too slow. In this instance, the output from the comparator 72 becomes as shown by the dotted line. When the falling edge (a) in FIG. 4(C) falls outside of the 650 $\mu$s window, shown in FIG. 4(D), output from the multivibrator 80, then the output from the OR gate 84 remains steady state as shown by the dotted line in FIG. 4(E). That is, the output from the OR gate 84 does not change state. Therefore, the output from the multivibrator 86 shown in FIG. 4(F) remains a steady state as shown by the dotted line. Therefore, a validation signal is not generated. It should be noted that the magnitude of the pulses in FIGS. 3(A)-3(L) and 4(A)-4(F) is not to scale.

As shown in FIGS. 3(A)-3(L) and 4(A)-4(F), the frequency of the coin tone must fall within a specified range (in this embodiment, 1700 Hz and 2200 Hz). Then, the frequencies must occur within a predetermined time period. If not, a coin drop is not validated. If a coin is validated, the microprocessor 58 determines whether the pulses are ON and OFF within a predetermined time period of each other.

The above-mentioned features of the present invention provide the advantages of being able to verify that a real coin rather than a counterfeit coin or no coin has been inserted into a pay telephone by employing the verification of both the frequency and current characteristics generated by a coin inserted into the pay telephone.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be resorted to as falling within the scope of the invention in the appended claims and their equivalents.

WHAT IS CLAIMED IS:

1. A coin tone validator for validating a coin inserted into a pay telephone, comprising:
    tone detection means for detecting a frequency of tone bursts from coins inserted into the pay telephone;
    validation means for detecting a valid current signature of the coins inserted into the pay telephone; and
    timing alignment comparator means for performing time and magnitude comparison of said current signature and said frequency of tone bursts for validating the coin drop.

2. A coin tone validator according to claim 1, wherein said tone detection means comprises: a transformer;
    relay means for bridging said transformer onto a pay telephone loop;
    amplifier means for receiving and amplifying the signals from said transformer;
    first filtering means for receiving and filtering noise from the amplified signal output from said amplifier; and
    frequency detector means for detecting the frequency of the coin dropped into the pay telephone and outputting a signal.

3. A coin tone validator according to claim 2, wherein said validation means comprises:
    current surge sensor means for detecting said current signature and outputting a signal;
    second filtering means for receiving and filtering noise from the signal output from said current surge sensor means;
    amplifier means for amplifying the filtered signal;
    envelope detector means for removing noise from the amplified and filtered signal;
    rise time and amplitude comparator means for receiving and comparing the amplified and filtered signal with predetermined values for determining a rise time of the signal;
    reset pulse generator means for limiting a pulse window of the amplified and filtered signal; and coin validation signal generator means for generating a qualifying pulse window, in accordance with said pulse window from said reset pulse generator, having a duration greater than an expected tone burst duration generated by the pay telephone for validating that a coin has been inserted into the pay telephone.

4. A coin tone validator according to claim 3, wherein said timing alignment comparator means comprises:
   first logic gate means for receiving and performing a logic operation on the signal output from said tone detection means and outputting a logic signal; and
   de-glitcher means for removing noise from the logic signal output from said first logic gate means and said tone detection means.

5. A coin validator according to claim 4, wherein said rise time and amplitude comparator means comprises:
   first and second comparators for detecting the rise time of the amplified and filtered signals.

6. A coin tone validator according to claim 5, wherein said reset pulse generator means comprises:
   a third comparator for limiting said pulse window of the amplified and filtered signal.

7. A coin tone validator according to claim 6, wherein said coin validation signal generator means comprises:
   a flip-flop, operatively connected to said first comparator and said third comparator, for receiving the outputs from said first comparator and said third comparator;
   a first multivibrator operatively connected to said first comparator;
   second logic gate means, operatively connected to said second comparator and said first multivibrator, for receiving the outputs from said second comparator and said first multivibrator and outputting a logic signal; and
   a second multivibrator operatively connected to receive the logic signal output from said second logic gate and outputting a signal to said timing alignment comparator means.

8. A coin tone validator according to claim 7, wherein said first and second logic gate means comprise an OR gate.

9. A coin tone validator for validating a coin inserted into a pay telephone paystation, comprising:
   a current surge sensor, operatively connected to the pay telephone, detecting a coin tone current signature from a coin inserted into the pay telephone and outputting a signal;
   frequency detectors, operatively connected to said current surge sensor, detecting the frequency of the coin inserted into the pay telephone;
   a first filter, operatively connected to said current surge sensor, receiving and filtering noise from the signal output from said current surge sensor;
   an amplifier, operatively connected to said first filter, for amplifying the filtered signal;
   a rise time and amplitude comparator, operatively connected to said first filter, for receiving and comparing the amplified and filtered signal with predetermined values for determining a rise time of the amplified filtered signal and outputting a signal;
   a reset pulse generator, operatively connected to said first filter, limiting a pulse window of the amplified and filtered signal;
   a pulse window generator, operatively connected to said rise time and amplitude comparator and said reset pulse generator, generating a qualifying pulse window, in accordance with said pulse window from said reset pulse generator and the signal from said rise time and amplitude comparator, having a duration greater than an expected tone frequency burst generated by the pay telephone for validating that a coin has been inserted into the pay telephone;
   logic means, operatively connected to said pulse window generator and said frequency detectors, for receiving an output from said frequency detectors, for generating a pulse to be counted and for validating that a coin has been inserted into the pay telephone; and
   processor means for qualifying that said pulse window is within a predetermined time period.

10. A coin tone validation according to claim 9, wherein said current surge sensor comprises:
    at least one opto-coupler for detecting the tone current signature of a coin.

11. A coin tone validator according to claim 10, wherein said rise time and amplitude comparator comprises:
    first and second comparators, operatively connected together, for detecting the rise time of the amplified and filtered signals; and
    wherein said reset pulse generator comprises:
    a third comparator for limiting said pulse window of the amplified and filtered signal.

12. A coin tone validator according to claim 11, wherein said pulse window generator comprises:
    a flip-flop, operatively connected to said first comparator and said third comparator, for receiving the outputs from said first and third comparators;
    a first multivibrator operatively connected to said first comparator;
    a logic gate, operatively connected to said second comparator and said second multivibrator, for receiving the outputs from said second comparator and said first multivibrator and outputting a logic signal; and
    a second multivibrator, operatively connected to receive the logic signal output from said logic gate and outputting a signal to said logic means for comparing said pulse window with a specified frequency.

* * * * *